United States Patent [19]

Gowrie

[11] 4,201,154
[45] May 6, 1980

[54] CHAMBERS FOR HOUSING ANIMALS IN TOXYCOLOGY LABORATORIES

[75] Inventor: Eric Gowrie, Knutsford, England

[73] Assignee: E. Gowrie Limited, Manchester, England

[21] Appl. No.: 905,469

[22] Filed: May 12, 1978

[30] Foreign Application Priority Data

May 13, 1977 [GB] United Kingdom ............... 20154/77

[51] Int. Cl.² ................................. 119 22; A01K 1/03
[52] U.S. Cl. .................................... 119/15; 119/17
[58] Field of Search ...................... 119/15, 16, 17, 18, 119/19, 21, 22, 30, 33, 37, 45 R

[56] References Cited

U.S. PATENT DOCUMENTS

| | | | |
|---|---|---|---|
| 1,658,515 | 2/1928 | Caton | 119/22 |
| 3,081,759 | 1/1962 | Helbig | 119/21 |
| 3,302,615 | 2/1967 | Tietje | 119/15 |
| 3,877,420 | 4/1975 | Eagleson, Jr. | 119/15 |

Primary Examiner—Hugh R. Chamblee
Attorney, Agent, or Firm—Norris & Bateman

[57] ABSTRACT

An inhalation chamber for housing animals in toxycology laboratories in which each animal cage is suspended from discs mounted on a shaft rotated slowly in the casing to bring each cage in turn below a controlled atmosphere inlet and maintaining the pressure in the chamber below atmospheric pressure to avoid leakage to atmosphere, with a scraper and water supply for removing droppings from a tray below each cage.

4 Claims, 5 Drawing Figures

CHAMBERS FOR HOUSING ANIMALS IN TOXYCOLOGY LABORATORIES

This invention relates to improvements in inhalation chambers for housing animals in toxycology laboratories.

The animals in inhalation chambers for laboratory animals are normally housed in cages in one or two or more tiers and if an atmosphere is circulated through the chambers the cages in the tiers are not all subjected to the same conditions which effects the results of the experiments.

The object of the invention is to provide a chamber for laboratory animals in which each cage in the chamber is subjected to identical conditions.

According to the invention an inhalation chamber for housing animals in toxycology laboratories comprises a casing supporting a rotary shaft carrying a disc at each end of the shaft, a plurality of platforms suspended on pivoted brackets from the peripheries of the discs to support cages, means for introducing a controlled atmosphere to the casing which is maintained at a pressure below atmosphere to prevent leakage therefrom, a droppings tray below each cage and a scraper for removing droppings from the tray.

The invention will be described with reference to the accompanying drawings.

Figure 1:
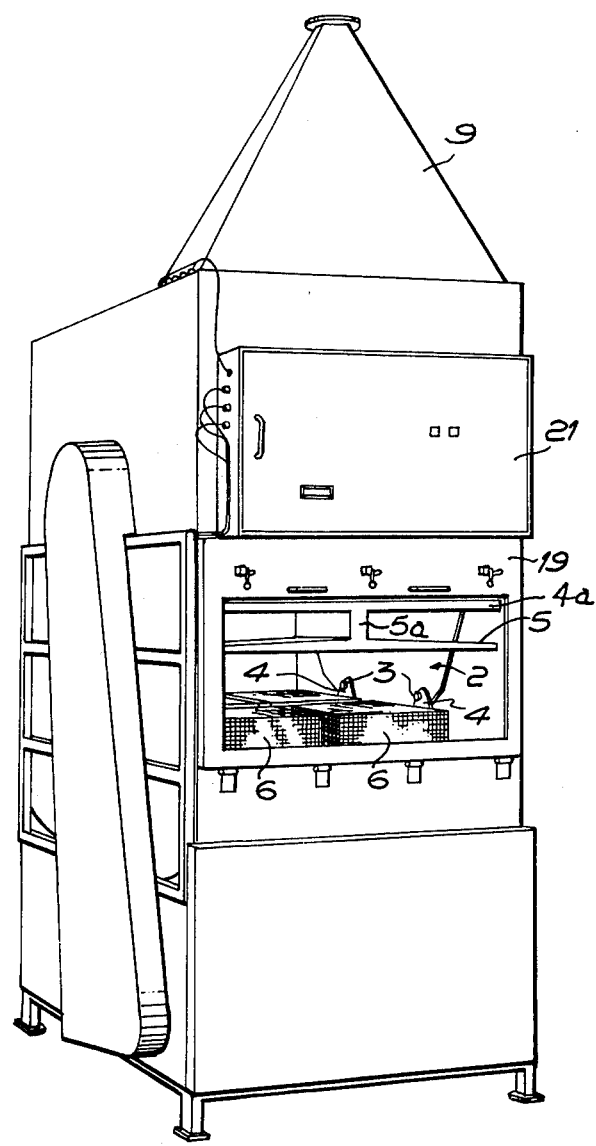
FIG. 1 is a perspective view of the inhalation apparatus.
Figure 2:
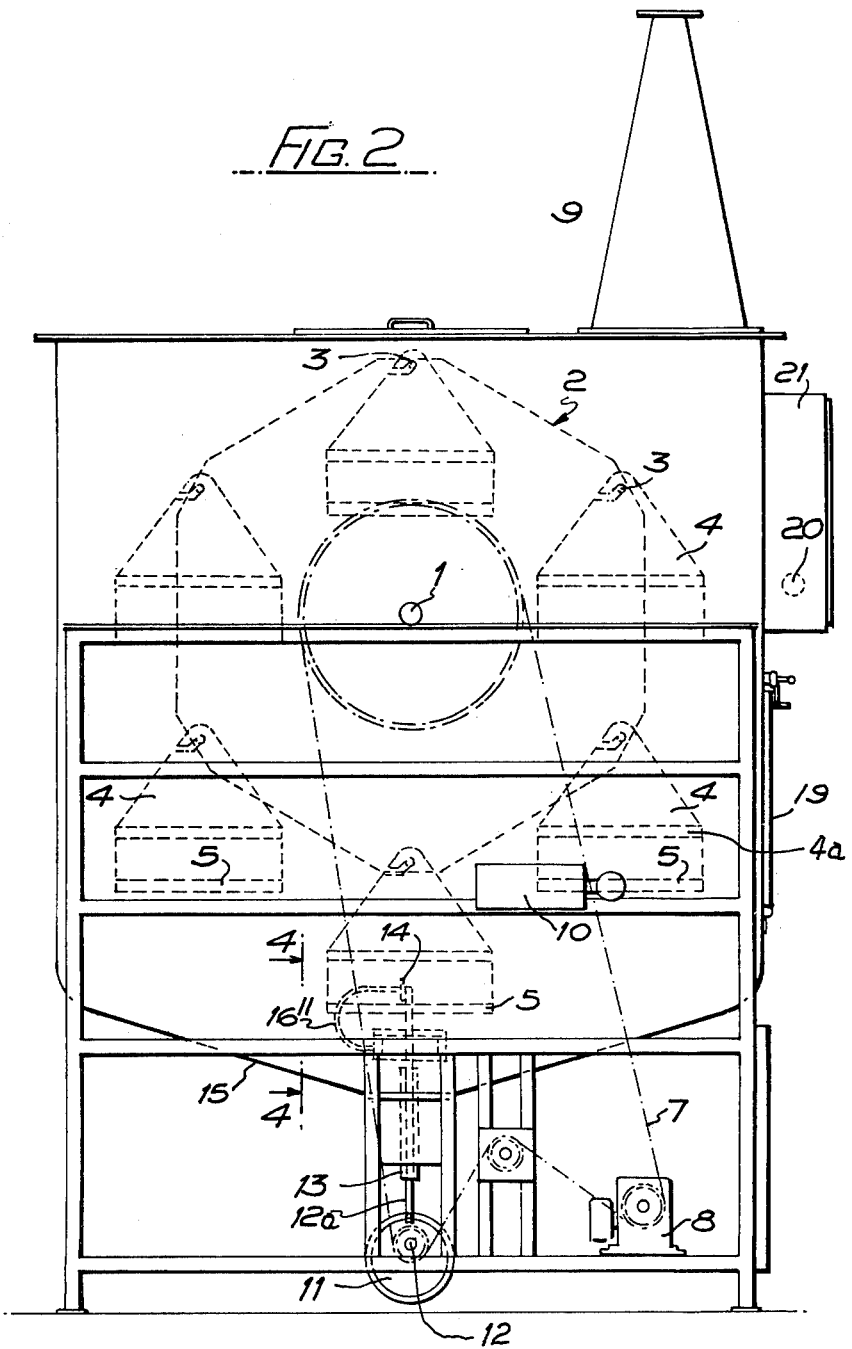
FIG. 2 is a side elevation with the outer casing removed.
Figure 3:
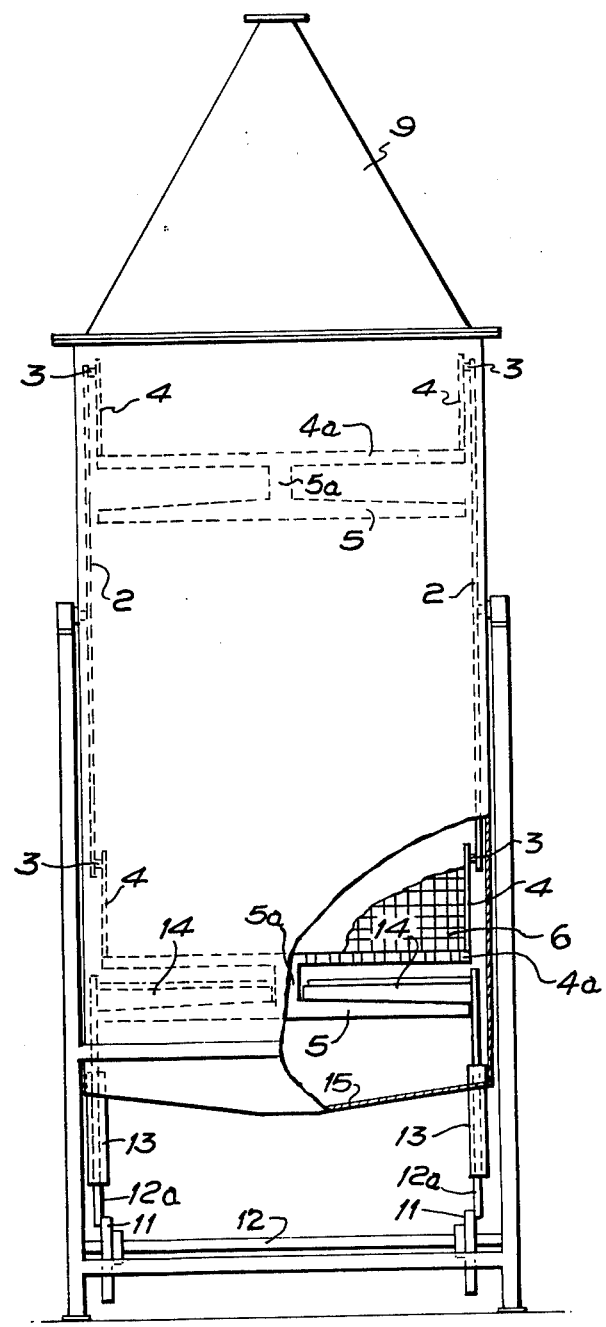
FIG. 3 is an end elevation of same.
Figure 4:
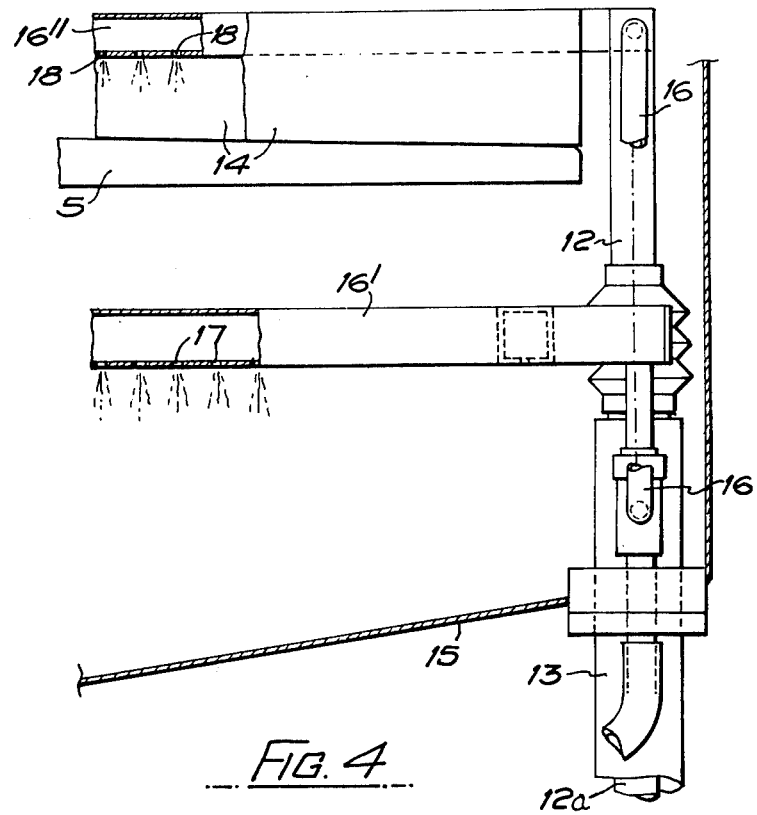
FIG. 4 is a detail section on line 4—4 FIG. 2 of the washing apparatus.
Figure 5:
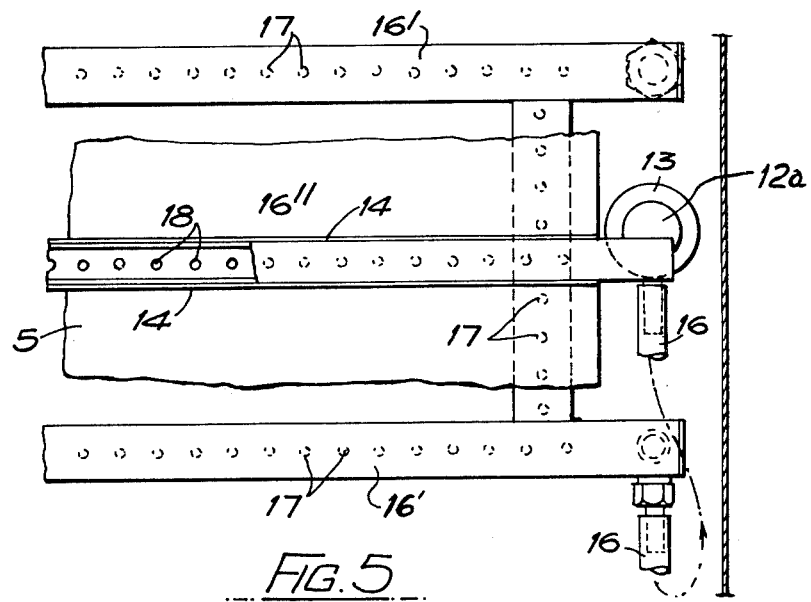
FIG. 5 is a plan of FIG. 4.

An inhalation chamber to house laboratory animals is formed with a shaft 1 extending between two opposite walls with discs 2 mounted on the shaft adjacent each wall.

A plurality of pins 3 extend longitudinally of the chamber from the two discs 2 adjacent the peripheries. Brackets 4 are suspended from pins 3 each aligned pair of brackets carrying a perforate animal support platform 4a arranged to hang in a horizontal position during rotation of the discs. Below each perforate platform 4a is a spaced droppings receiving tray or platform 5 mounted on member 5a depending from platform 4a. A mesh cage or cages 6 for the animals are carried on each platform 4a.

The shaft 1 and discs 2 are rotated by a chain 7 by a motor 8 the discs rotating at say one half revolution per minute. The pressure inside the inhalation chamber is kept below atmosphere to avoid any leakage therefrom and the cages pass in turn below an air inlet duct 9 which may be dust laden or otherwise treated according to the experiments being undertaken and may be heated to a controlled temperature.

A limit switch 10 engages the chain 7 and should a cage cause the tightening of the chain the chain operates the switch to stop the motor.

The chain 7 also drives two eccentrics 11 on a shaft 12 each reciprocating a rod 12a guided by a tube 13 and carrying a scraper 14 which as each bracket passes the lowermost position scrape the bottom of a platform 5 below the cage to remove the droppings.

A water circulation pipe 16 is provided with sprays 17 to wash the bottom of the platform or tray 5 to remove the droppings therefrom and a further pipe 16¹ and sprays 18 to cleanse the scrapers 13, the platform moving over the scraper as the cage passes through the lowermost position of the disc. A valve is operated to control the flow of water as the tray engages and leaves the scraper.

A door 19 is provided to give access to the chamber and a lamp 20 for lighting purposes in a control box 21.

A fan (not shown) draws the air from the inlet 9 and exhausts the air through an exhaust aperture in the chamber.

What I claim is:

1. An inhalation chamber for housing animals in toxycology laboratories comprising a hermetically sealed casing, a rotary shaft supported by the casing, a motor drive connected to said shaft, a disc at each end of the shaft, a plurality of platforms, brackets pivoted on the discs and adapted to support the platforms, mesh cages carried by the platforms so that during rotation of the discs each of the cages is maintained in a horizontal position, means for introducing a controlled atmosphere to the casing and maintaining the atmosphere therein below atmospheric pressure, a droppings tray below each cage, a scraper for removing the droppings from a tray, and means including cam means driven by said motor for periodically activating the scraper to cleanse the lowermost of said droppings trays.

2. An inhalation chamber as in claim 1 in which jets in a water supply pipe spray the tray subjected to scraping and further jets spray said scraper as the tray passes thereover.

3. An inhalation chamber as defined in claim 1, wherein the motor drive is connected to an eccentric which periodically lowers and raises the scraper relative to said lowermost droppings tray.

4. An inhalation chamber as defined in claim 3, comprising a chain drive between the motor and shaft and a control switch for said motor constructed and arranged to stop the motor upon predetermined tightening of said chain.

* * * * *